No. 875,488. PATENTED DEC. 31, 1907.
A. BAGNULO.
ROTATING MOTOR WITH RECTILINEAR CYLINDERS.
APPLICATION FILED JAN. 16, 1906.
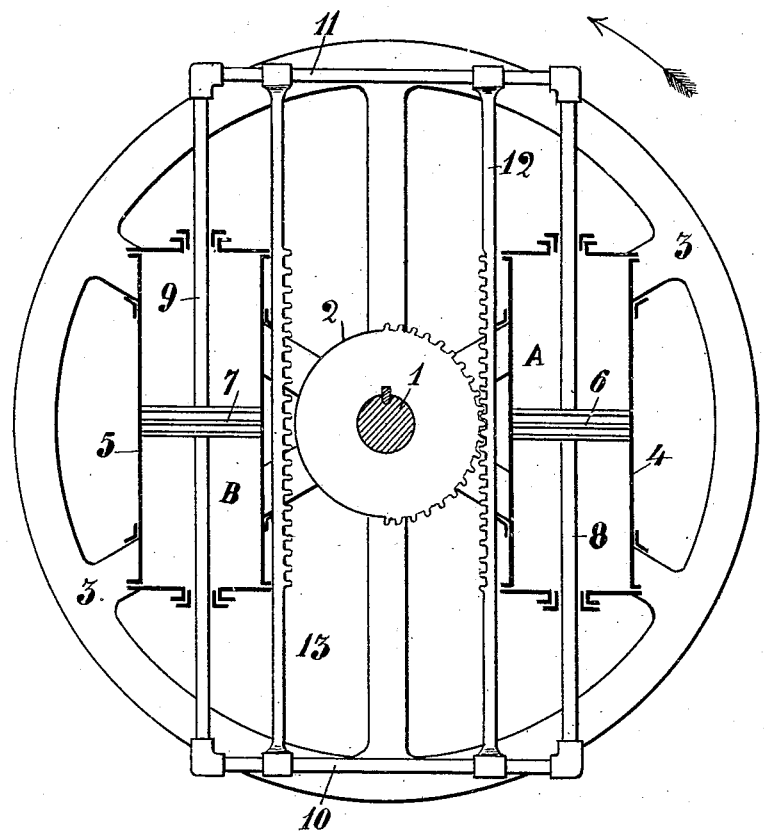
WITNESSES
W. M. Avery
A. H. Davis
INVENTOR
Alberto Bagnulo
BY
Munn & Co
ATTORNEYS

UNITED STATES PATENT OFFICE.

ALBERTO BAGNULO, OF NAPLES, ITALY.

ROTATING MOTOR WITH RECTILINEAR CYLINDERS.

No. 875,488.  Specification of Letters Patent.  Patented Dec. 31, 1907.

Application filed January 16, 1906. Serial No. 296,373.

*To all whom it may concern:*

Be it known that I, ALBERTO BAGNULO, a subject of the King of Italy, residing in Naples, Piazza Gesù e Maria, Italy, have invented certain new and useful Improvements in Rotating Motors with Rectilinear Cylinders, of which the following is a specification.

This invention consists of a mechanism for the direct transformation of the rectilinear alternative motion of a piston, under the pressure of any fluid, into continual circular motion.

To obtain the continuity of the circular motion the cylinder and piston turn round a fixed axle that bears the whole system.

The cylinder and the piston move at the same time so that at first the cylinder moves faster than the piston pushing the loose wheel around until the piston has reached the bottom of the cylinder, then it is the piston that moves faster than the cylinder, while the rotary motion continues in the same direction. This second part of the movement is brought on either by a flywheel connected to the turning or loose wheel, or by a second cylinder in which the piston works in the opposite direction and acts like the first cylinder.

The accompanying drawing shows one of these motors with two cylinders.

On a fixed shaft 1 a wheel 2 half cogged and half smooth is fastened. On the same shaft 1 the wheel 3 turns loose and receives the rotary motion; on this wheel 3 the two cylinders 4 and 5 are fastened.

Shaft 1 is hollow and on it turns a collar, not shown in the drawings, it communicates with the tubes that bring and discharge the fluid from and into the cylinders; in fact it acts like a valve of distribution. The piston 6, 7 carried by rods 8, 9 are rigidly connected by cross pieces 10, 11. To the latter are attached two bars 12, 13 partly furnished with cogs that have to work with those of wheel No. 2.

The mechanism works as follows: Admitting that all parts are situated as shown in the drawings and the fluid under pression entering the upper chamber A of the cylinder 4. The piston 6 is pushed downwards but cannot move in that direction because it is fastened to the frame 9 8 10 11 of which the cogged bar 12 catches with half cogged wheel 2. It will be the cylinder 4 fastened to the loose wheel 3 that will move, pushed by the pressure of the fluid on its upper lid or bottom; by this movement the piston will come nearer to the lower bottom of the cylinder 4, while the cogged bar 12 inclines to the left with the frame to which it belongs and catches with its cogs in those of wheel 2. By this movement wheel 3 carried by the cylinders turns in the direction indicated by the arrow. After a quarter of a turn, when the rods 8, 9 have taken a horizontal position, piston 6 arrives at the bottom of cylinder 4 and cogged bar 12 is about to leave the cogs of wheel 2, then cogged bar 13 will be about to catch with the other end of the same cogs. In this position the admission of the fluid in chamber A of cylinder 4 is stopped, the discharge valve opens, while the fluid begins entering into chamber B of cylinder 5 and it will act as cylinder 4 did. During this second movement while chamber A becomes empty, the cogged part of bar 12 runs on the smooth part of wheel 2 and does not find any resistance while it moves in a direction opposite to the movement produced by the turning of the frame.

Claims.

1. In a rotary engine, the combination with the toothed rack and wheel, of two piston-rods, fixed on either side of the piston and rigidly connected to either end of the rack, substantially as shown and described.

2. In a rotary engine, the combination with the toothed rack and wheel, and double piston-rods, of one or two revolving cylinders having the axis of symmetry displaced from the axis of revolution, and the center of symmetry placed on the perpendicular from the center of revolution, to the axis of symmetry, substantially as shown and described.

3. In a rotary engine, the combination with the toothed wheel and driving wheel, of two cylinders and racks placed symmetrically to the axis of revolution, and piston rods rigidly connected with cross bars all arranged and adapted to operate the engine as a double acting engine, as substantially shown and described.

4. A rotary engine comprising a fixed shaft, a fly-wheel loosely journaled thereon, a cylinder on the face of the wheel, a rod traversing the cylinder and provided with a piston in the cylinder, a rack bar parallel with the rod and connected thereto, and a mutilated gear-wheel secured to the shaft and meshing with the rack bar.

Signed by me at Rome, in the Kingdom of Italy this 22nd day of December 1905.

ALBERTO BAGNULO.

Witnesses:
I. DEL GENEDETTI,
A. RAGGI.